(12) United States Patent
Reed, Sr. et al.

(10) Patent No.: US 11,047,410 B1
(45) Date of Patent: Jun. 29, 2021

(54) ADJUSTABLE SHIM

(71) Applicant: Cutting Edge Tooling, LLC, Russellville, AR (US)

(72) Inventors: David R. Reed, Sr., Russellville, AR (US); David R. Reed, Jr., Russellville, AR (US); Robert Galla, Atkins, AR (US); Anthony Thomas, Russellville, AR (US); Sean Thomas, Russellville, AR (US); Corey Binkley, Fort Payne, AL (US); Robert Richardson, Galivants Ferry, SC (US)

(73) Assignee: Cutting Edge Tooling LLC, Russellville, AR (US)

( * ) Notice: Subject to any disclaimer, the term of this patent is extended or adjusted under 35 U.S.C. 154(b) by 281 days.

(21) Appl. No.: 15/987,383

(22) Filed: May 23, 2018

(51) Int. Cl.
*F16B 5/02* (2006.01)
*F16B 23/00* (2006.01)
(Continued)

(52) U.S. Cl.
CPC .......... *F16B 5/0283* (2013.01); *F16B 5/0233* (2013.01); *F16B 23/0069* (2013.01);
(Continued)

(58) Field of Classification Search
CPC ..... F16B 5/0233; F16B 5/0275; F16B 5/0283
(Continued)

(56) References Cited

U.S. PATENT DOCUMENTS

| | | | |
|---|---|---|---|
| 1,144,795 A | * | 6/1915 | Schmelzkopf ..... B23Q 17/2225 408/116 |
| 2,012,155 A | | 8/1935 | Behnke |

(Continued)

FOREIGN PATENT DOCUMENTS

WO    WO2012155908    11/2012

*Primary Examiner* — Flemming Saether
(74) *Attorney, Agent, or Firm* — Joe D. Calhoun

(57) ABSTRACT

An apparatus for aligning and shimming plates being anchored to a substratum having a plurality of threaded anchor holes coaxially aligned with corresponding apertures and coaxial threaded bores through each plate. The apparatus includes an external threaded cylindrical shim having a shimming surface and a second (outer) surface adapted to accept rotary force for rotational movement and adjustment of the separation produced by the shim between the substratum and the anchored plate. For anchoring, the $2^{nd}$ surface of the shim further includes a counterbored or countersunk hole having a shoulder including a narrower passthrough aperture aligned with the threaded anchor hole, through which an anchor screw extends for rotational mating with the threaded anchor hole. The anchor screw also has a head wider than the passthrough aperture, and adapted to accept rotary force for rotational movement and fixing the shim in place. The apparatus may also include a cap covering the anchor screw head within the counterbored or countersunk hole, to provide a more continuous planar surface and to prevent grit or other unwanted material from collecting in the hole. The apparatus may also include an adjustment tool interfacing with the shim $2^{nd}$ surface and/or the cap outer surface, for applying the desired amount of rotational force.

9 Claims, 18 Drawing Sheets

(51) Int. Cl.
*F16B 37/12* (2006.01)
*E06B 1/60* (2006.01)

(52) U.S. Cl.
CPC .......... *F16B 37/125* (2013.01); *E06B 1/6076* (2013.01); *F16B 23/0038* (2013.01)

(58) Field of Classification Search
USPC .............................. 411/546, 389; 81/DIG. 5
See application file for complete search history.

(56) References Cited

U.S. PATENT DOCUMENTS

| | | | |
|---|---|---|---|
| 2,020,222 A | | 11/1935 | Tautz |
| 2,337,984 A | * | 12/1943 | Flowers ................ F16B 5/0233 411/190 |
| 3,604,306 A | | 9/1971 | Denholm |
| 4,043,239 A | | 8/1977 | DeFusco |
| 4,360,993 A | * | 11/1982 | Tomokazu .......... E04F 13/0807 52/365 |
| 5,199,693 A | * | 4/1993 | Johanson ............. B23Q 1/5462 269/93 |
| 6,584,745 B1 | * | 7/2003 | Johansson ................ E04B 5/48 52/480 |
| 6,826,878 B1 | * | 12/2004 | Rovtar .................. E06B 1/6076 411/383 |
| 7,987,637 B2 | | 8/2011 | Smith |
| 8,141,828 B2 | | 3/2012 | Clark |
| 9,303,532 B2 | | 4/2016 | Klingler |
| 9,550,297 B2 | | 1/2017 | Saadat |
| 9,766,427 B1 | * | 9/2017 | Barney ................ G02B 7/1825 |
| 2005/0050818 A1 | * | 3/2005 | Chen .................... F16B 5/0233 52/263 |

* cited by examiner

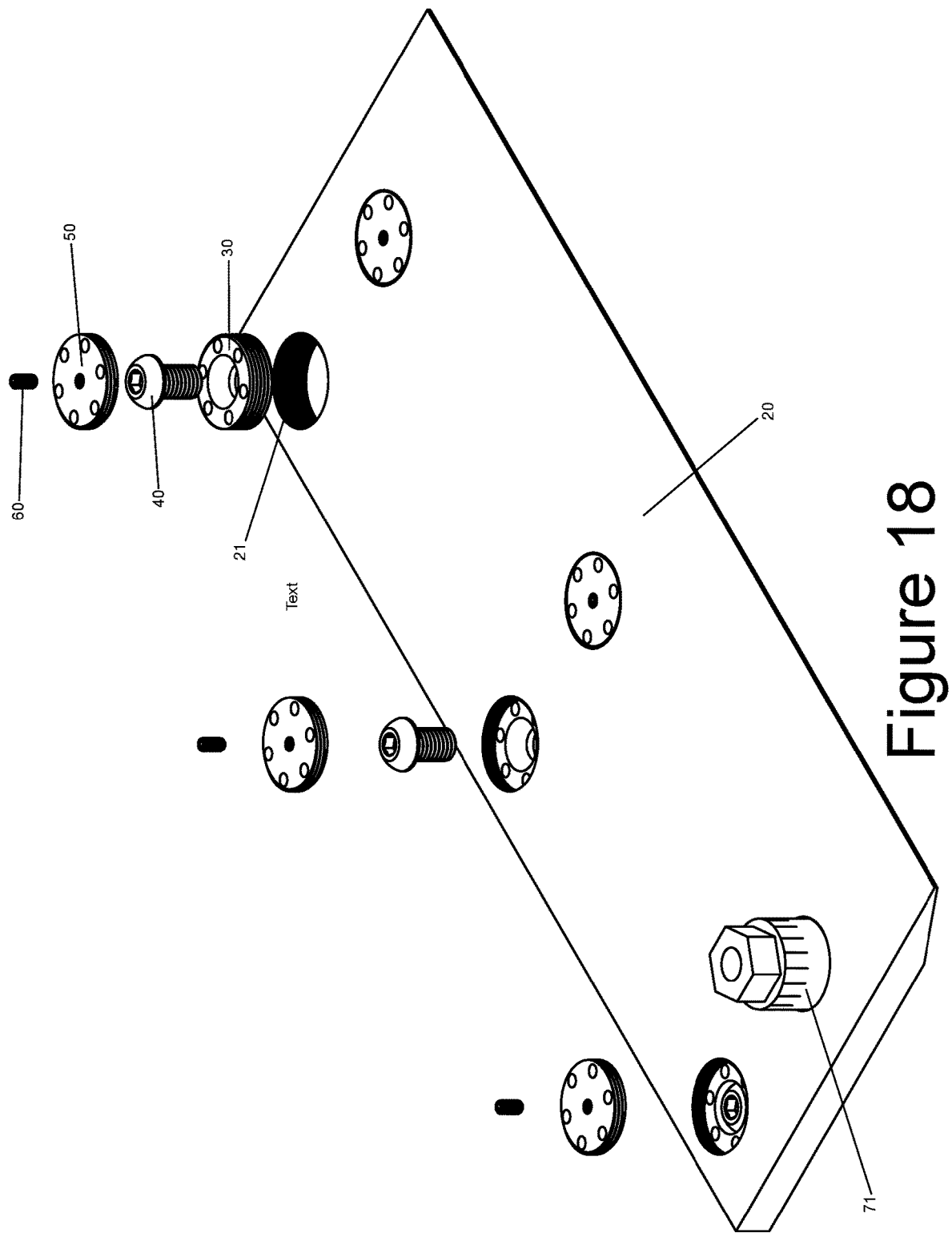

ADJUSTABLE SHIM

CROSS REFERENCE TO RELATED APPLICATIONS

Not applicable.

FEDERALLY SPONSORED RESEARCH AND DEVELOPMENT

Not applicable.

MICROFICHE APPENDIX

Not applicable.

BACKGROUND OF THE INVENTION

(1) Field of the Invention

The present invention relates to shimming devices and mechanisms for aligning and/or leveling adjacent parts or surfaces. More particularly, the invention disclosed herein relates to adjustable shims capable of a variable amount of such alignment and/or leveling.

(2) Background of the Invention

The prior art includes a number of shim devices for aligning parts and/or reducing wear. The traditional shim was a wedge placed between two articles; the further it was positioned between the two articles, the greater their separation. A number of advances have also appeared in the field.

U.S. Pat. No. 2,020,222 issued to Tauntz discloses a planar insert occupying a matching cutout in a work table (such as for a circular saw), to align the surface of the insert with that of the surrounding work surface. The underside of the table has finger-like supports projecting into the cutout void at a plane lower than the bottom of the insert, at least approximating four corners of the insert. Aligned with each fingertip support is a lug downstanding from the underside of the insert; the lug is essentially a headless screw having a slot in the end, to accept a flat head screw driver to adjust the amount it is screwed in. The upper plane of the insert is determined by the adjustment of the lugs supported upon each respective finger.

U.S. Pat. No. 7,987,637 issued to Smith discloses a rotatably adjustable shim for installing doors plumb with a door jam within a door frame. A base plate mounts on the door frame, with an internally threaded cylinder protruding perpendicularly towards the door jam. The shim includes a hollow bolt that screws into the internally threaded cylinder on the door frame; encircling the head of that bolt is an open-top cylindrical housing affixed to the door jam, so that rotation of that hollow bolt in that internally threaded cylinder will move the door jam (and hingedly attached door) closer or further from the door frame.

U.S. Pat. No. 9,303,532 issued to Klingler discloses a rotatably adjustable gib shim used to adjust the gap between a gas turbine and an attached combustor unit. A stop-block is anchored to the base of the assembly, and a movable gib key is attached to the turbine to be aligned a specified distance from the combustor unit; the block and gib key maintain a nested relationship, each having interfacing tapered surfaces slidable along their interface according to the rotation of an externally threaded shim within a threaded bore through an arm of the gib key positioned perpendicularly to the tapered surfaces. The spacing between the turbine and compressor may thereby be adjusted by rotating the shim within the threaded bore. The distance between the turbine and combustor unit is fixed by two bolts extending through the surface of the gib key having the threaded bore and externally threaded shim, and screwed into a threaded bore in the opposing surface of the block.

The prior art also includes square or rectangular wear plates, used as a controlling surface for the flow of a part moving through a machine center. Each typically has a bore through each corner, for accepting a bolt anchoring it to a bottom plate or other substratum; the bore is a "counterbore", having a larger diameter toward the top of the plate (or an annular ledge, landing or shoulder below the bore opening), so that the head of the bolt is sunken below the top surface of the wear plate. Importantly, often a shim (or other spacer) needs to be inserted between the wear plate and the base plate, to level or align the top surface of the wear plate with its neighboring plates. To do so usually requires removing most (if not all) of the anchor bolts . . . sometimes multiple times.

Nothing in the known prior art discloses a rotatably adjustable shim for leveling and aligning co-planar plates atop a base, including a cylindrical externally-threaded shim rotatably engageable with the threads of a bore extending transversely through one top plate and having a top surface having holes accepting projections of an adjustment tool for rotatably adjusting the amount of protrusion of the bottom surface below the plate to contact the base. Neither does any known prior art disclose the top surface also including a counterbored or countersunk bore accepting an anchor bolt extending through the plate and into an aligned threaded bore in the base, thereby locking the positioning of the threaded shim.

SUMMARY OF THE INVENTION

The present invention replaces those shims and anchor-bolt-removals with what is essentially a rotary shim incorporated into an externally-threaded cylinder occupying the bore formerly occupied by the anchor bolt. One particular embodiment of the invention disclosed herein includes a rotatably adjustable shim for leveling and aligning one or more co-planar wear plates atop a base, including:

(a) a cylindrical externally-threaded shim rotatably engageable with the threads of a bore extending transversely through a top wear plate and having, (b) a top surface having holes accepting projections of an adjustment tool for rotatably adjusting the amount of protrusion of the bottom surface from the wear plate to contact the base, and (c) the top surface also including a counterbore accepting an anchor bolt extending through the wear plate and into an aligned threaded bore in the base, thereby locking the positioning of the threaded shim.

Additional elements of the disclosed invention may include:

(d) periodically spaced markings on the tool, to gauge the amount of vertical adjustment of the adjuster shim; and (e) an externally threaded top cap having a vertically adjustable axial support; and a wrench-like tool for rotating the adjuster shim within the threaded bore to adjust the height of the wear plate, and/or for rotating the cap into position atop the adjuster shim to prevent the deposit of grit or other matter in the cavities of the adjuster shim.

The invention is essentially a system for leveling (and aligning) one or more rigid wear plates, for anchoring atop or to an anchor plate. Although such aligned-and-leveled wear plates (atop an anchor plate) are typically used in saw mills, the leveling/alignment functionality might be applicable to other fields of use. In the saw mill context, the anchor plate supports several co-planar top wear plates having top surfaces which must be leveled and aligned. The top plates are called "wear plates" or "wear surfaces" or "anvils", which control the flow of the cut of the logs as they are being transported through the milling process. When one or more wear plates become worn down, they have to be replaced . . . and leveled and aligned with the adjacent plates.

In general, the apparatus disclosed herein includes (comprises) a shim rotatably adjustable within a threaded bore extending through a plate for alignment on a substratum, the shim being anchored to the substratum with an anchor screw recessed within a counterbore or countersunk bore within the plate, and with the countersunk/counterbore hole covered by a cap affixed in place by a set screw. A number of plates can have their outward-facing surfaces aligned independently, each plate being adjustably alignable by one or a plurality of shims within separate threaded bores. Such adjustable alignment can be accomplished by the rotation of a multi-pronged adjustment tool, without removal of separate shimming plates (or wedges) or anchor screws.

In general, the system disclosed herein includes the aforementioned plate(s) together with the shims, anchor screws, caps, set screws and adjustment tool.

One primary benefit of the disclosed invention is that it allows for the positioning and alignment of each plate independently of other adjacent or nearby plates, but in conjunction with other such plates to the extent desired.

Another benefit of the disclosed invention is that it allows adjustment to a minute degree, using indicia markings on the adjustment tool and/or the plate.

Another benefit of the disclosed invention is that it allows shimming adjustments without removal of separate shimming plates (or wedges) or anchor screws.

Other benefits of the disclosed invention will become apparent to somebody of ordinary skill in the field, after a review of this disclosure.

These and other aspects of the disclosed subject matter, as well as additional novel features, will be apparent from the description provided herein. The intent of this summary is not to be a comprehensive description of the subject matter, but rather to provide a short overview of some of the subject matter's functionality. Other systems, methods, features and advantages herein provided will become apparent to one with skill in the art upon examination of the accompanying Figures and detailed description. It is intended that all such additional systems, methods, features and advantages that are included within this description, be within the scope of any claims set forth herein or filed later.

BRIEF DESCRIPTION OF THE DRAWINGS

FIG. 18 depicts the system is various stages; counterclockwise from the corner at the top of the page. First shown are all of the components aligned above a threaded bore of a plate, ready for rotational engagement. The threaded bore immediately to the left has an adjuster shim screwed therein, with its bottom shimming surface (not shown) protruding below the lower surface of the plate adjacent or near to the substratum (not shown); awaiting rotational engagement are the anchor bolt, cap and set screw. The next threaded bore to the left has the anchor screw engaged and seated within the counterbored hole. On the plate below the counterbored is an adjustment tool positioned with its prongs inserted into the orifices of the second surface of an adjuster shim; the hexagonal profile of the non-prong end is sized to accommodate a socket wrench or similar standard tool, for applying rotary force. The threaded bore of the plate immediately to the right has a cap screwed into the threaded bore, with the set screw also rotationally engaged to affix the cap in place.

Figure 1:
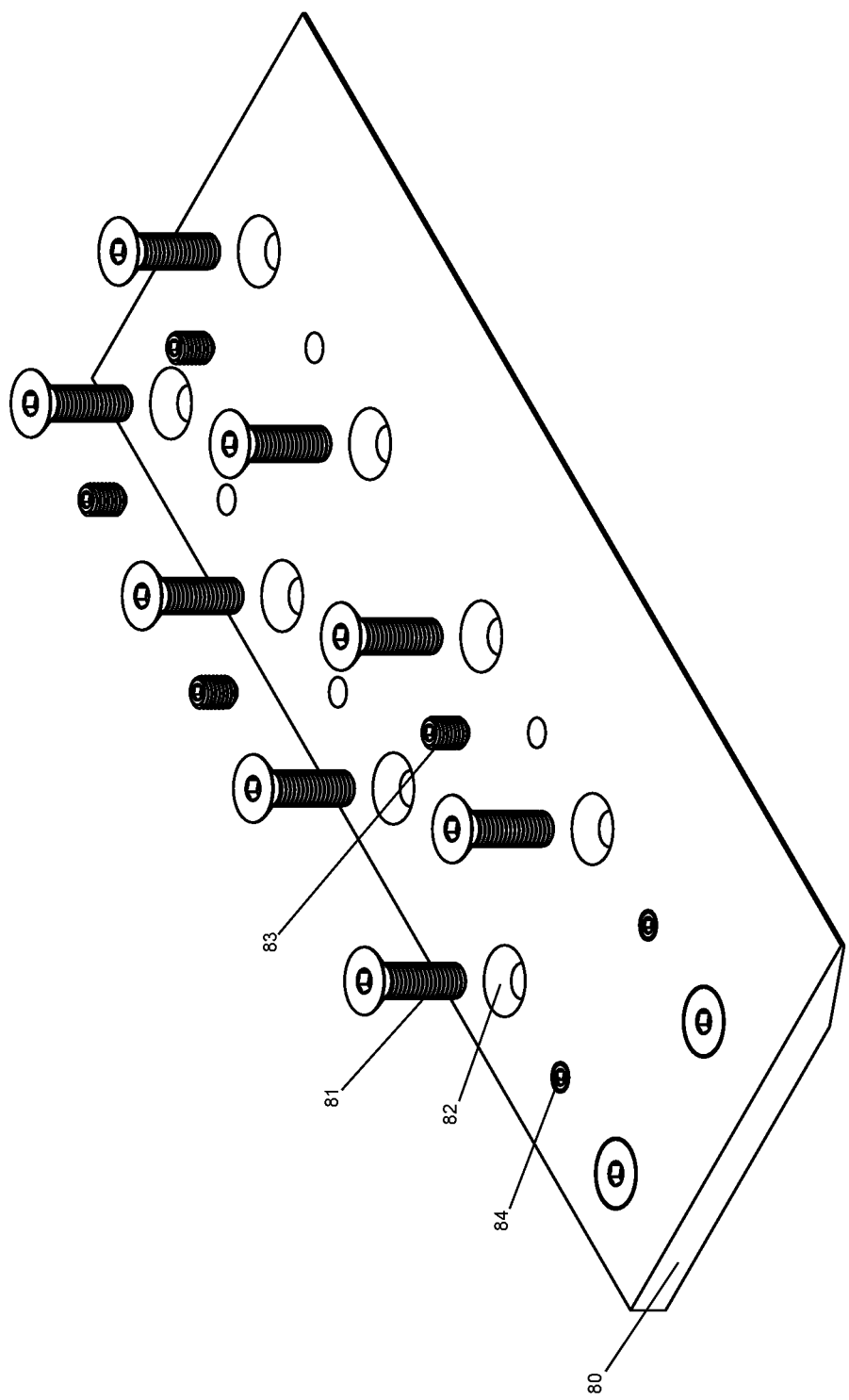
FIG. 1 is perspective view of a representative sample of a prior art wear plate (80) having anchor screws (81) within countersunk holes (82) and set screws (83) within a tapped hole inside the wear plate (84).
Figure 2:
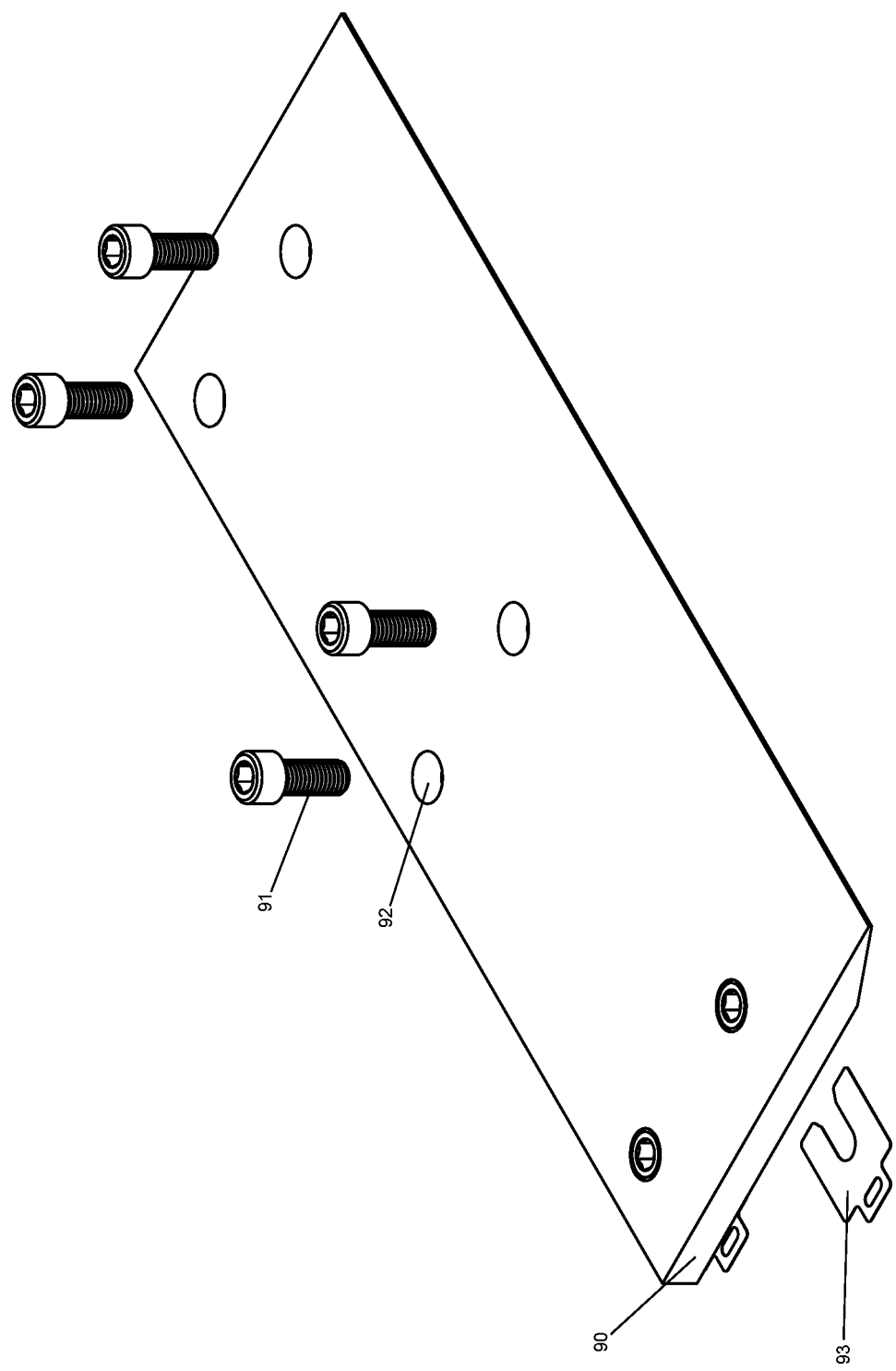
FIG. 2 is a perspective view of another representative sample of a prior art wear plate (90) having anchor screws (91) within counterbored holes (92), and including a separate shim (93).
Figure 3:
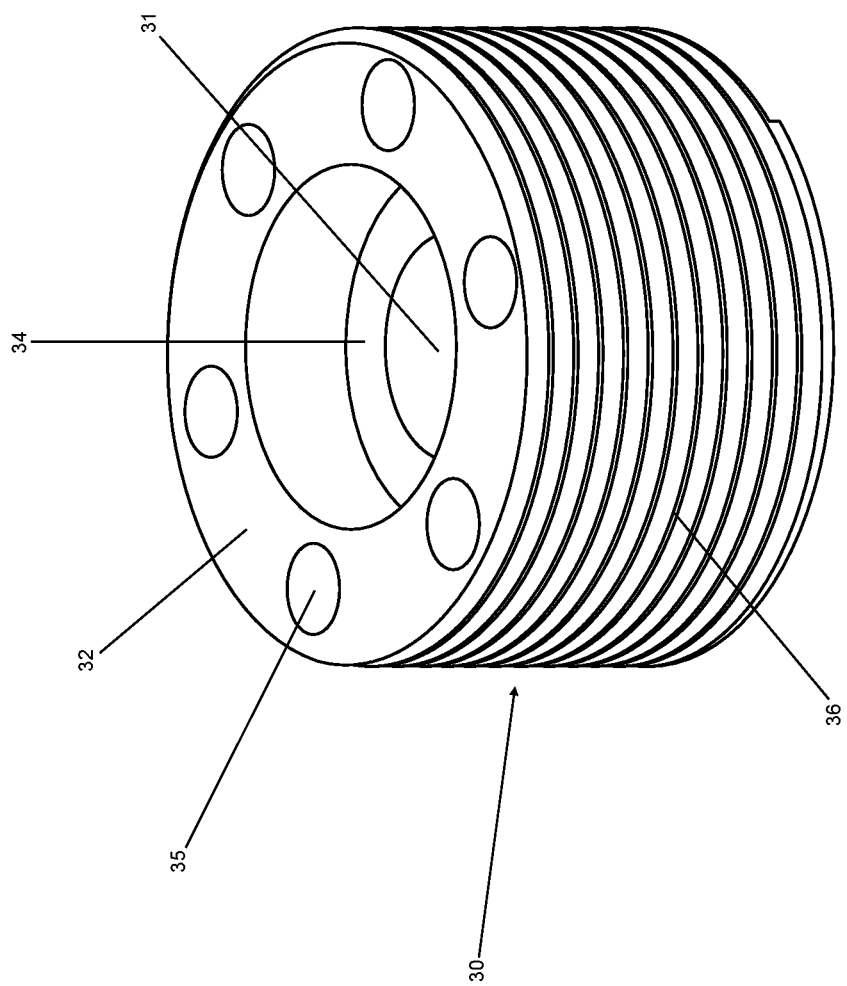
FIG. 3 is a perspective view of a representative sample of a cylindrical shim body of the threaded adjuster (30) having external threading (36) between a shimming surface (not shown) and a second (top) surface (32) defining orifices (35) accepting the prongs of an adjustment tool depicted in FIG. 11; also shown is a passthrough aperture (31) a counterbored or countersunk shoulder (34) to support the head of an anchor screw (not shown).
Figure 4:
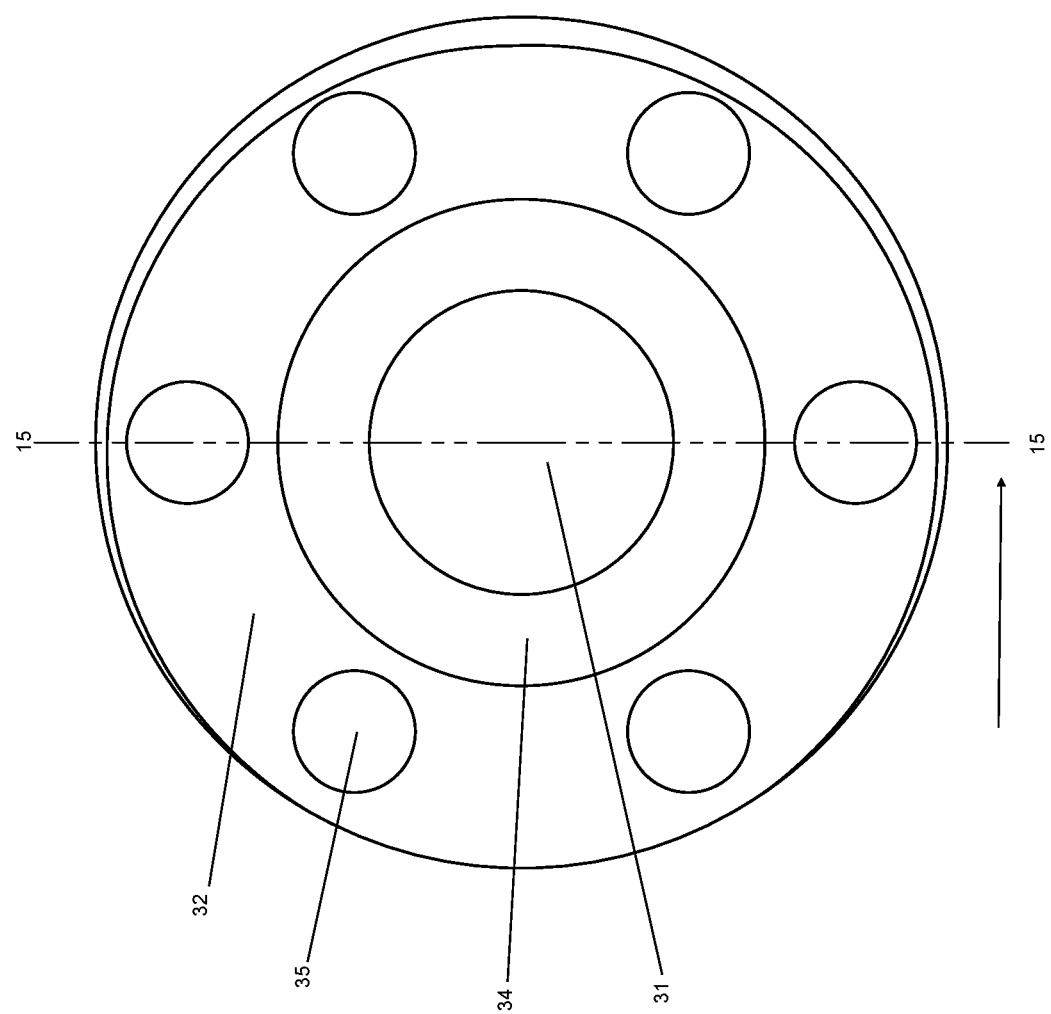
FIG. 4 is a top plan view of the adjuster shim of FIG. 3.
Figure 5:
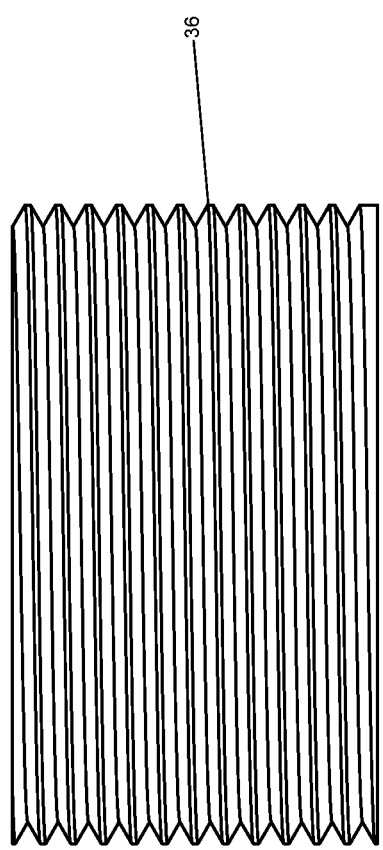
FIG. 5 is a side elevation view thereof.
Figure 6:
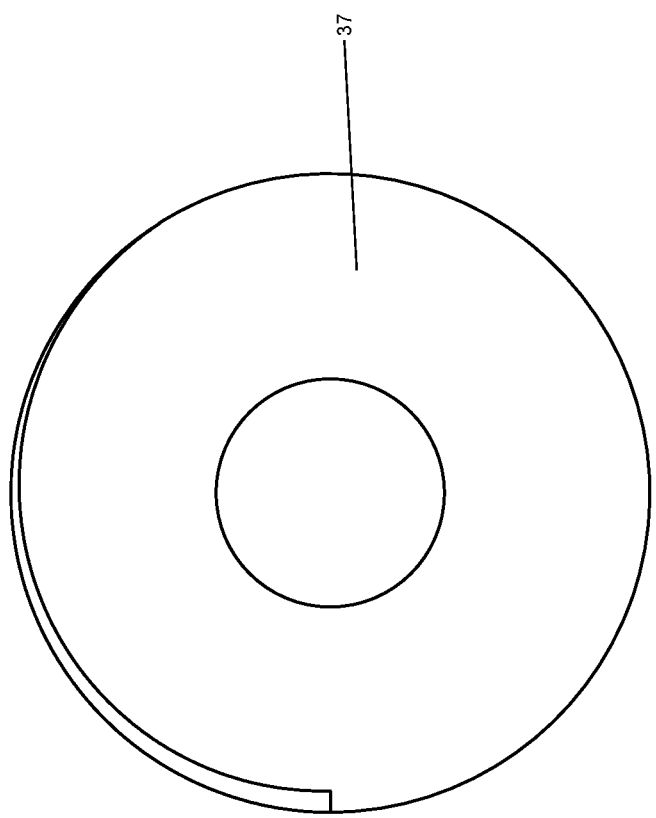
FIG. 6 is a bottom plan view thereof.
Figure 7:
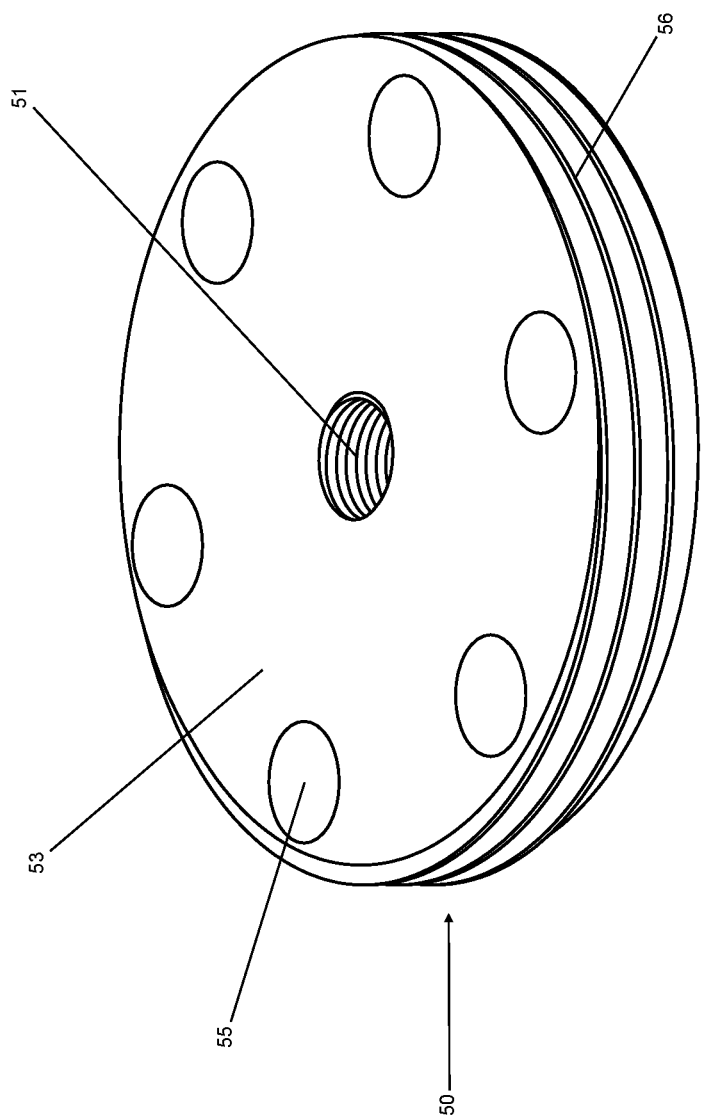
FIG. 7 is a perspective view of a representative sample of a disk-shaped cap (50) having external threading (56) between a leading surface (not shown) and an outer surface (53) defining orifices (55) accepting the prongs of an adjustment tool depicted in FIG. 11; also shown is a threaded eyelet (51).
Figure 8:
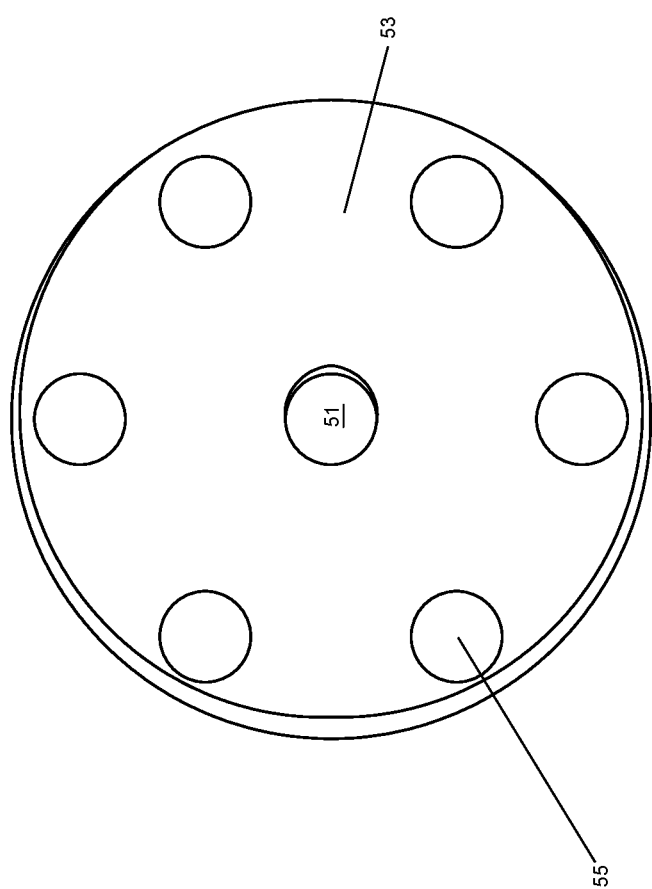
FIG. 8 is a top plan view of the cap of FIG. 7.
Figure 9:
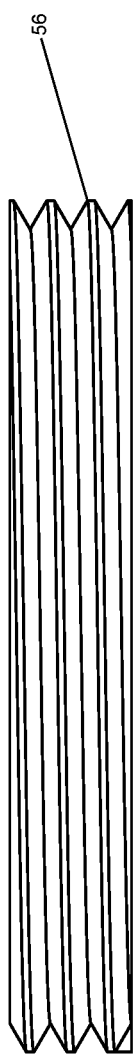
FIG. 9 is a side elevation thereof.
Figure 10:
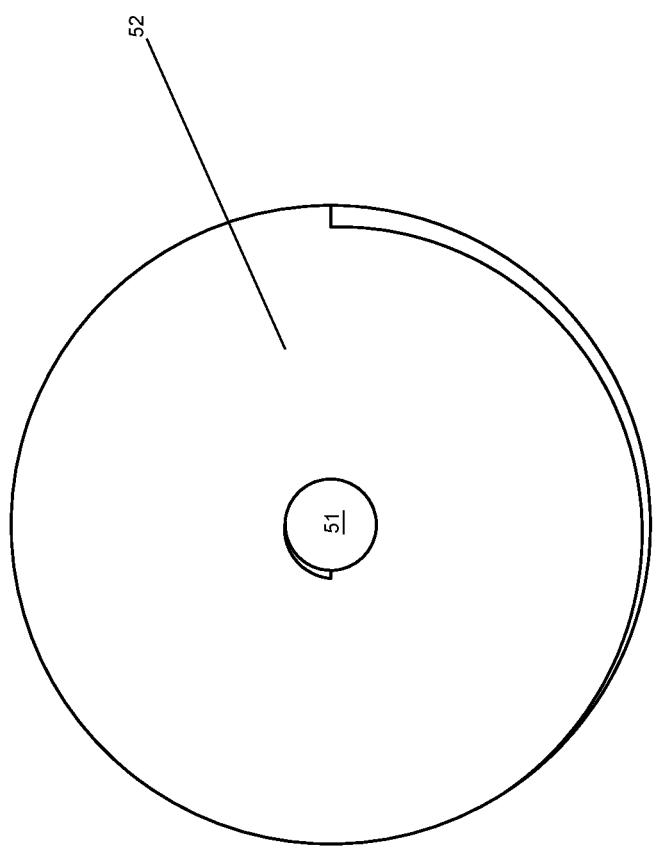
FIG. 10 is a bottom plan view thereof.
Figure 11:
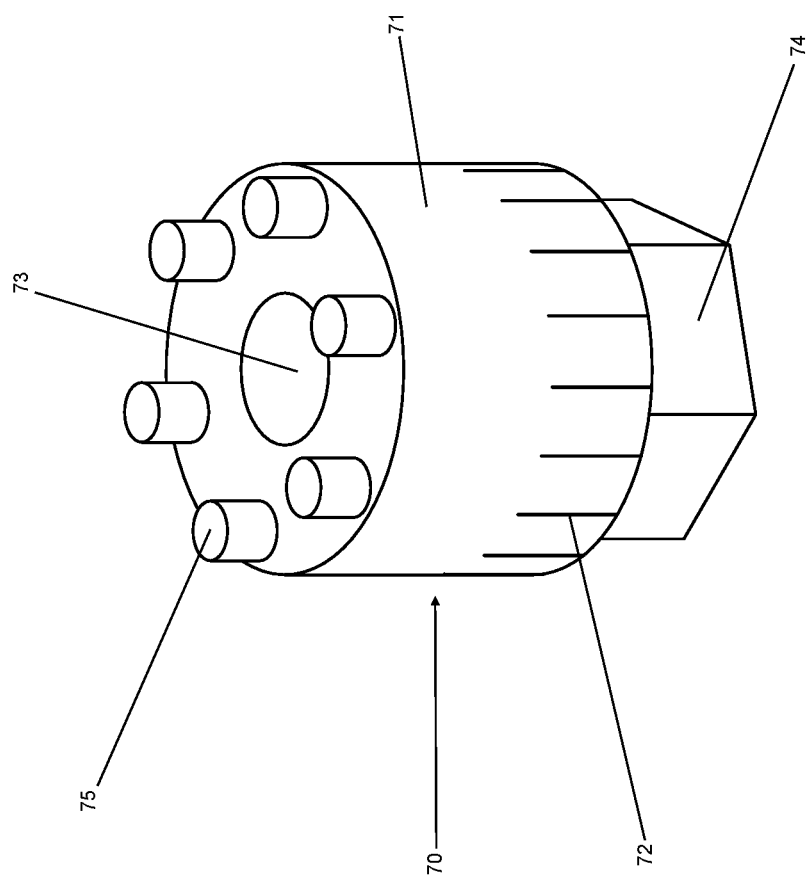
FIG. 11 is a perspective view of a representative sample of an adjustment tool (70) showing a cylindrical body (71) having indicia markings (72) and supporting outstanding prongs (75) for insertion onto the orifices of an adjuster shim (not shown) or a cap (not shown).
Figure 12:
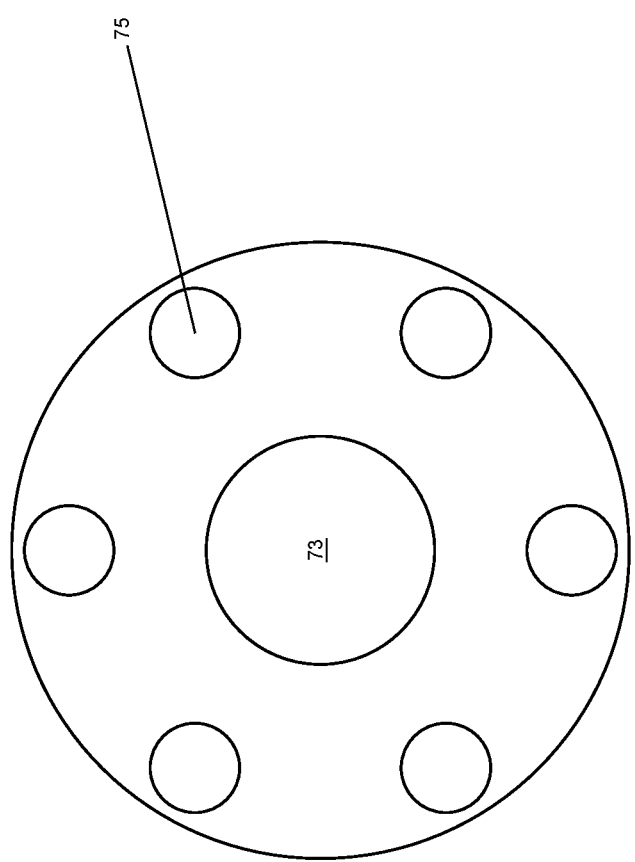
FIG. 12 is a bottom plan view of the adjustment tool of FIG. 11.
Figure 13:
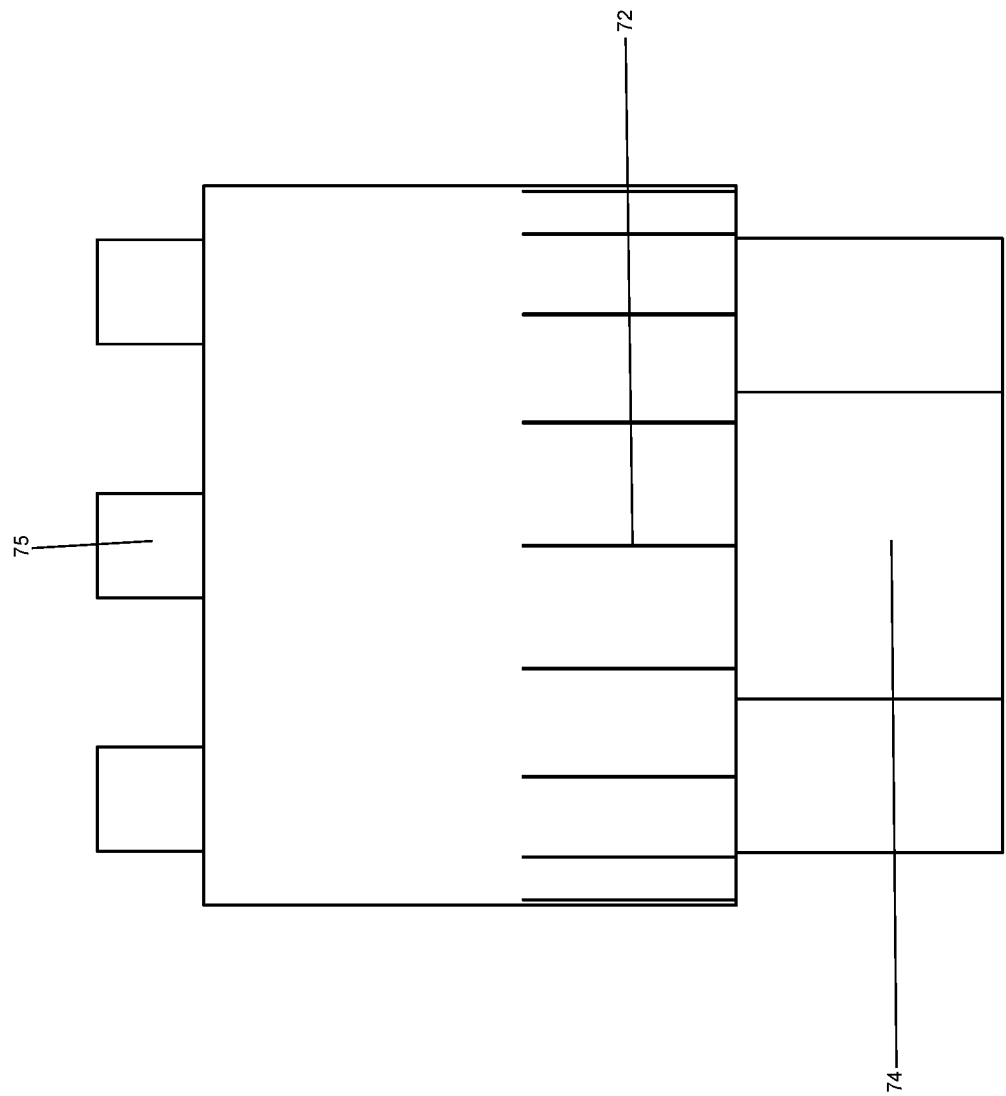
FIG. 13 is a side elevation view thereof.
Figure 14:
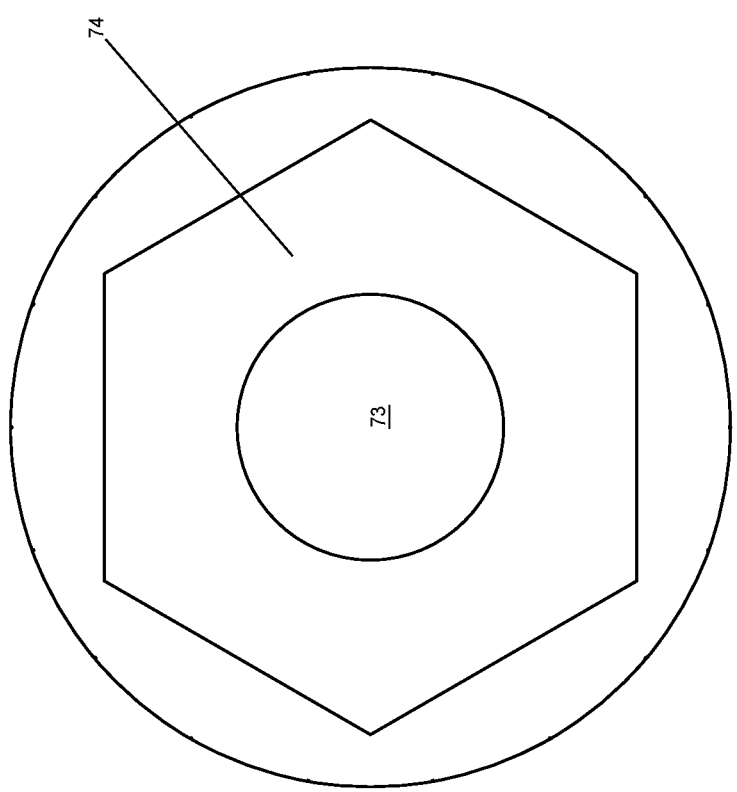
FIG. 14 is a top plan view thereof.

These drawings illustrate certain details of certain embodiments. However, the invention disclosed herein is not limited to only the embodiments so illustrated. The invention disclosed herein may have equally effective or legally equivalent embodiments.

DETAILED DESCRIPTION OF THE INVENTION

The terminology used herein is for the purpose of describing particular embodiments only and is not intended to be limiting. As used herein, the singular forms "a", "an", and "the" are intended to include the plural forms as well, unless the context clearly indicates otherwise. It will be further understood that the terms "comprises" and/or "comprising", or "includes" and/or "including", or "have" or "having", when used in this specification, specify the presence of stated features, regions, integers, steps, operations, elements and/or components, but do not preclude the presence or addition of one or more other features, regions, integers, steps, operations, elements, components and/or groups thereof.

For the sake of simplicity and to give the claims of this patent application the broadest interpretation and construction possible, the conjunctive "and" may also be taken to include the disjunctive "or," and vice versa, whenever necessary to give the claims of this patent application the broadest interpretation and construction possible. Likewise, when the plural form is used, it may be taken to include the singular form, and vice versa.

It will be understood that, although the terms first, second, third, etc. may be used herein to describe various elements, these elements should not be limited by these terms. These terms are only used to distinguish one element from another element. Likewise, synonyms for the same element, term or concept may be used only to distinguish one similar element from another, unless the context clearly indicates otherwise.

The term "counterbored" (or derivative thereof) includes countersunk (or applicable derivative thereof), even though "countersunk" typically connotes converging or more beveled sidewalls rather than the more perpendicular sidewalls connoted by "counterbored"; either structure may, so long as the functional requirements of providing a space within the plate for an anchor screw to be recessed within the plate, and with the countersunk/counterbore hole coverable by a cap.

Any bolt, screw or other fastener described herein may be interchangeable with another fastener, so long as the respective structural and functional requirements are satisfied.

The disclosure herein is not limited by construction materials to the extent that other materials satisfy the structural and/or functional requirements. For example, any material may be used so long as it satisfies the functional and rigid structural requirements for which it is being used. In one embodiment, the apparatus and/or system is constructed of steel material; however, any material of sufficient rigidity and strength will suffice as well. Likewise, the invention disclosed herein is not limited by any construction process or method.

Figure 15:
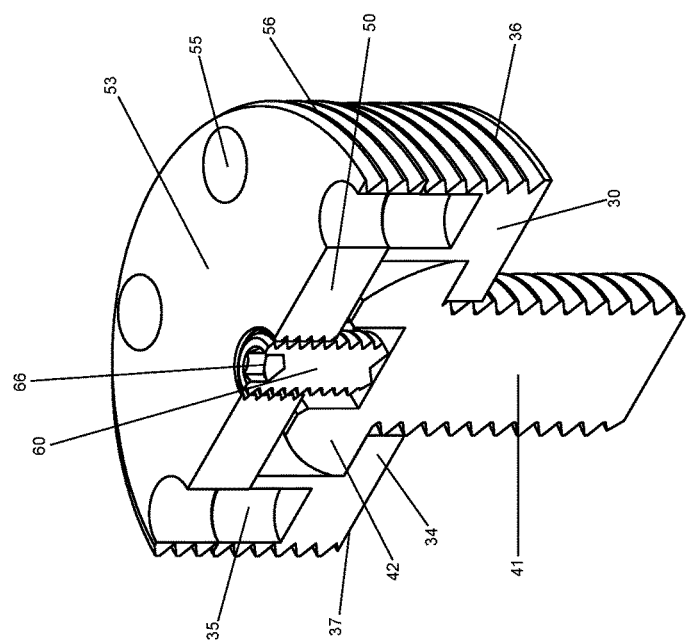
FIG. 15 is a perspective cross-section view thereof at the plane 15-15 shown on FIG. 4.
Figure 16:
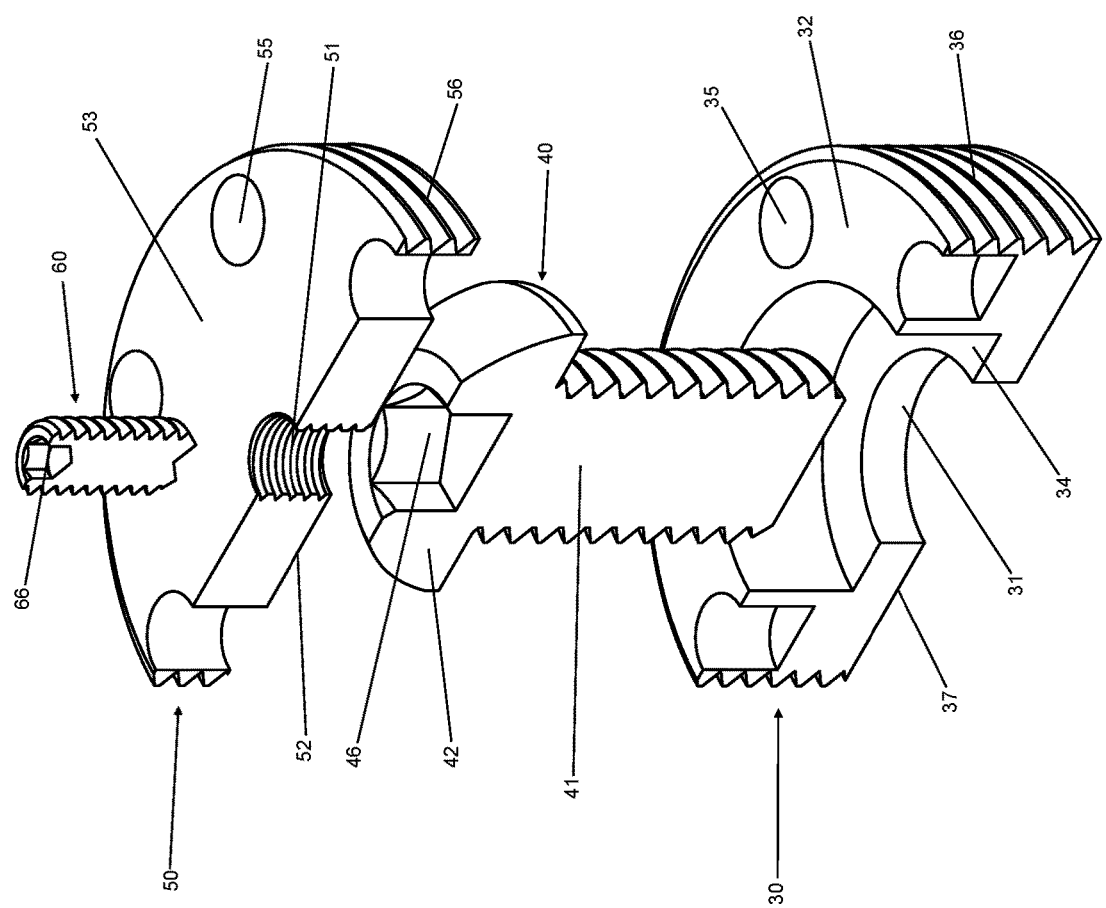
FIG. 16 is an exploded view of FIG. 15.
Figure 17:
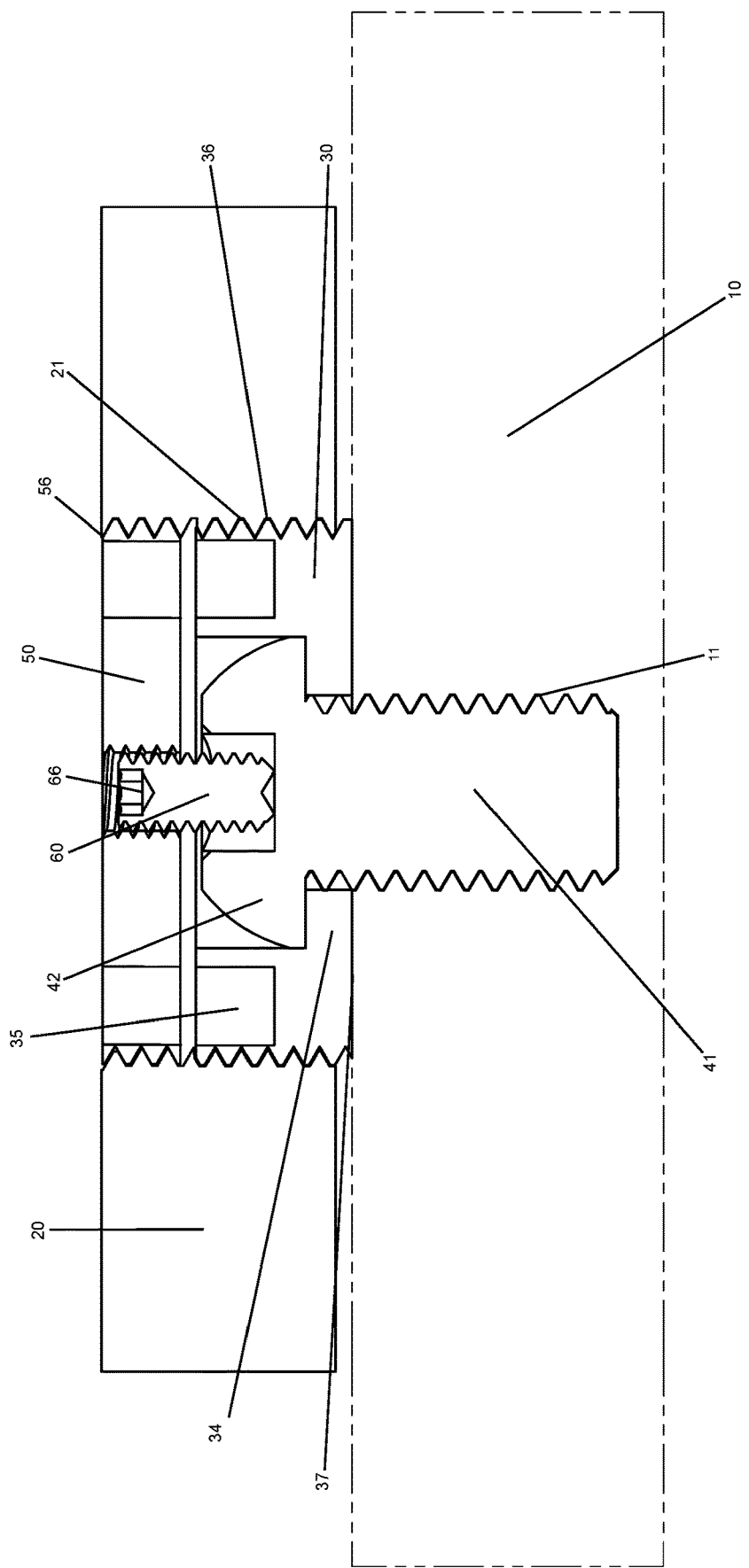
FIG. 17 is a side elevation cross-section view of the system in use.

FIGS. 3-6 depict different views of a representative example of a rotary cylindrical adjuster shim. FIGS. 7-10 depict different views of a representative example of a cap for a rotary cylindrical adjuster shim. FIGS. 11-14 depict different views of a representative example of an adjustment tool. FIGS. 15-17 depict the adjuster shimming system in use.

In general, the invention disclosed herein includes an apparatus for adjusting a wear plate (20) for anchoring to a substratum (10) having a plurality of threaded anchor holes (11) coaxially aligned with corresponding apertures and coaxial threaded bores (21) through the wear plate. The apparatus may include, for each threaded anchor hole, an adjuster shim (30) having external threading (36) between the adjuster bottom (37) protrudable into contact with the substratum, and a second surface (32) adapted to accept rotary force for rotational movement. The amount of rotation of the shim within the threaded bore of the wear plate governs the amount of protrusion of the adjuster shim's shimming surface past the surface of the wear plate nearest to the substratum, and into contact with the substratum; the orientation of the opposite surface of the wear plate can thereby be adjusted, as needed for that wear plate alone or in conjunction with other adjacent or nearby wear plates. The shim further may include a countersunk hole (33) having an annular floor (34) including a narrower passthrough aperture (31) aligned with the threaded anchor hole.

Also included should be a means for rotating the shim within the threaded bore through the wear plate, until the shimming side of the adjustable shim contacts the substratum and separates the plate and substratum a desired amount. One representative example of such a means for rotating the adjustable shim may include a plurality of orifices (35) in the second surface, each sized to snugly accept insertion of a corresponding prong manipulated by the user. For example, an array of 2 to 6 orifices may be arranged periodically around the perimeter of the second surface of the adjustable shim, that accepts insertion of corresponding prongs of an adjustment tool used for applying rotary force to the adjustable shim within the threaded bore of the plate. The holes need not be the same size or depth, or be arranged with regular periodic spacing, so long as the prongs of the tool mirror such arrangement.

FIGS. 11-14 depict a representative sample of an adjustment tool used for raising and lowering the adjustable shim within a threaded bore of a plate. This example includes a generally cylindrical body having a multi-pronged end and an opposite end having a hexagonal cross-section, for accommodating a socket wrench or similar tool for applying rotary force. The longitudinal axis includes a throughway bore, for allowing access to either the anchor screw head or the set screw head for tightening or loosening. Indicia markings are periodically spaced around the cylindrical body of the adjustment tool, for determining the amount of raising or lowering of the adjustable shim being accomplished by rotation of the tool. For example, given the thread count (number of threads per inch or other distance) of the anchor screw and threaded bore, rotation of the cylindrical body of the tool a particular number of degrees will raise or lower the shimming surface of the adjustable shim a known distance; therefore, marks around the circumference of the cylindrical body will gauge the corresponding amount of such raising or lowering. For instance, with a thread count of 12 threads per inch, rotating the cylindrical body of the tool between two of the periodically spaced marks will produce a raising or lowering of the shimming surface 0.005 inches. Therefore, the alignment of plates can be accomplished to a high degree of specificity.

The apparatus also may also include an anchor screw (40) having a threaded body (41) extending through the passthrough aperture for rotational mating with the threaded anchor hole, for anchoring to the substratum. The anchor screw also has a head (42) wider than the passthrough aperture and adapted to accept rotary force for rotational movement.

Also included should be a means for rotating the anchor screw within the threaded anchor hole until the anchor screw head contacts the counterbore/countersunk shoulder (34) a desired amount to pressure the anchor screw threads against the anchor hole threads to hinder further rotation of the adjuster shim within the threaded bore. One representative example of such a means for rotating the anchor screw may include the anchor screw head defining a non-round cavity as the adaptation to accept rotary force. The non-round cavity need not have walls arranged in any particular manner or depth, so long as the cavity is capable of accepting something inserted for imparting rotary force to the anchor screw. But one example may include a cavity having from three to six or more sides. One particular example is an anchor screw head defining a hexagonal cavity, for accepting an Allen wrench.

Another representative example of such a means for rotating the anchor screw may include the anchor screw head having a non-round perimeter as the adaptation to accept rotary force. The non-round perimeter of the anchor screw head need not have sides arranged in any particular manner or depth, so long as the configuration of sides is capable of accepting something for imparting rotary force to the anchor screw. For example, the non-round perimeter may include a hexagonal perimeter acceptable to a socket wrench.

The apparatus disclosed herein may further include a cap including external threading between a leading surface and an outer surface adapted to accept rotary force for rotational movement. The cap further may include a threaded eyelet aligned with the anchor screw head, for accepting a set screw for rotational mating with the threaded eyelet and having an outer end adapted to accept rotary force and an inner end for contacting the anchor screw head. The cap outer surface may include a plurality of orifices, each sized to snugly accept insertion of a corresponding prong manipulated by the user.

The set screw outer end may include a non-round cavity as the adaptation to accept rotary force. The non-round cavity need not have walls arranged in any particular manner or depth, so long as the cavity is capable of accepting something inserted for imparting rotary force to the anchor screw. But one example may include a cavity having from three to six or more sides. One particular example is an anchor screw head defining a hexagonal cavity, for accepting an Allen wrench.

In one particular embodiment of the invention disclosed herein, the adjustable shim may include an externally threaded cylinder having a shimming surface. It may also include a second surface including a counterbored/countersunk hole having a floor defining a passthrough aperture aligned with the substratum anchor hole. The second surface also may include an annular face defining a plurality of orifices, each sized for snugly accepting a separate prong of an adjustment tool. The anchor screw may include a head defining a hexagonal cavity size to snugly accept an Allen wrench. The apparatus further may include a disk-shaped cap having an inner surface and an outer surface, with a threaded eyelet extending between the surfaces and being aligned with the anchor screw head. The outer surface may also include a plurality of orifices arranged in the same configuration as the plurality of orifices of the adjustable shim, for snugly accepting a separate prong of the same adjustment tool as used to adjust the adjustable shim.

Besides the apparatus described above, the present invention includes a system aligning a plate for anchoring to a substratum having a plurality of threaded anchor holes. The system may include (comprise):

(a) a wear plate having a plurality of threaded bores coaxially aligned with corresponding threaded anchor holes, and for each threaded bore;

(b) an adjustable shim having external threading between a shimming surface and a second surface adapted to accept rotary force for rotational movement of the shim within the threaded bore, with the second surface further including a counterbored/countersunk hole having a floor including a narrower passthrough aperture aligned with the threaded anchor hole;

(c) an anchor screw having a threaded body extending through the passthrough aperture for rotational mating with the threaded anchor hole for anchoring to the substratum, and having a head wider than the passthrough aperture and adapted to accept rotary force for rotational movement;

(d) a means for rotating the adjustable shim within the threaded bore through the wear plate until the shimming side of the adjustable shim contacts the substratum and separates the plate and substratum a desired amount; and (e) a means for rotating the anchor screw within the threaded anchor hole until the anchor screw head contacts the adjustable shim floor a desired amount to pressure the anchor screw threads against the anchor hole threads to hinder further rotation of the adjustable shim within the threaded bore.

The system further may include a plurality of such wear plates aligned for anchoring to a substratum, each wear plate alignable independently of the other plates by each respective wear plate's adjustable shims, anchor screws, means for rotating the adjustable shim within the threaded bore through the plate and means for rotating the anchor screw within the threaded anchor hole.

Besides the apparatus and system described herein, the claimed invention further includes a method of aligning at least one plate for anchoring to a substratum having a plurality of threaded anchor holes coaxially aligned with corresponding apertures and coaxial threaded bores through each respective plate. Such method may include the steps of, for each aperture in each respective wear plate:

(a) applying rotary force to the adjustable shim within the threaded bore of the wear plate, until the shimming side of the adjustable shim contacts the substratum and aligns the plate as desired; and (b) extending the end of the anchor screw through the passthrough aperture and into the threaded anchor hole, then applying rotary force to the anchor screw head until the anchor screw head contacts the counterbored/countersunk shoulder (34) a desired amount to pressure the anchor screw threads against the anchor hole threads to hinder further rotation of the adjustable shim within the threaded bore.

The method may include the further steps of:

(a) applying rotary force to the cap within the threaded bore of the wear plate until the outer surface is aligned as desired; and (b) applying rotary force to the set screw within the threaded eyelet and against the anchor screw head a desired amount, to pressure the set screw threads against the threaded eyelet threads to hinder further rotation of the cap within the threaded bore, and to provide vertical support for the outer surface of the cap to withstand pressure thereon.

Other aspects of the disclosed invention will be apparent to somebody of ordinary skill in the art, after consideration of this specification.

We claim:

1. An apparatus for aligning the surface of at least one plate being anchored to a substratum having a plurality of threaded anchor holes coaxially aligned with corresponding apertures and coaxial threaded bores through the plate, the apparatus comprising, for each threaded anchor hole:

(a) an adjustable shim below the upper surface of the plate and comprising external threading between a shimming surface protrudable into contact with the substratum, and a second surface adapted to accept rotary force for rotational movement to accomplish said protrusion, the adjustable shim further comprising a counterbored hole having an inwardly extending ledge defining a narrower passthrough aperture aligned with the threaded anchor hole;

(b) an anchor screw having a threaded body extending through the passthrough aperture for rotational mating with the threaded anchor hole for anchoring to the substratum, and having a head below the upper surface of the plate and wider than the passthrough aperture and adapted to accept rotary force for rotational movement;

(c) a means for rotating the shim within the threaded bore through the plate until the shimming side of the shim contacts the substratum and separates the plate and substratum a desired amount;

(d) a means for rotating the anchor screw within the threaded anchor hole until the anchor screw head contacts the ledge a desired amount to pressure the anchor screw threads against the anchor hole threads to hinder further rotation of the shim within the threaded bore to simultaneously lock both the threaded shim to the substratum and the vertical adjustment of the plate; and (e) a cap including external threading between a leading surface and an outer surface adapted to accept rotary force for rotational movement, the cap further comprising a threaded eyelet aligned with the anchor screw head, and a set screw for rotational mating with the threaded eyelet and having an outer end adapted to accept rotary force and an inner end for contacting the anchor screw head.

2. An apparatus described in claim 1, said cap outer surface comprising a plurality of orifices, each sized to snugly accept insertion of a corresponding prong manipulated by the user.

3. An apparatus described in claim 2, said set screw outer end defining a non-round cavity as said adaptation to accept rotary force.

4. An apparatus described in claim 3, said set screw outer end defining a hexagonal cavity acceptable to an Allen wrench.

5. An apparatus described in claim 1:

(a) said second surface also including an annular face defining a plurality of orifices each sized for snugly accepting a separate prong of an adjustment tool for imparting rotary force for rotational movement to accomplish said protrusion;

(b) said head defining a hexagonal cavity size to snugly accept an Allen wrench;

(c) said cap having a disk shape and further comprising an outer surface defining a plurality of orifices arranged as the plurality of orifices of the shim for snugly accepting the prongs of the adjustment tool; and (d) the adjustment tool comprising said prongs supported by a cylindrical body including indicia periodically spaced around the cylindrical circumference, indicating the amount of protrusion of the shim's shimming surface past the surface of the plate nearest to the substratum.

6. An apparatus described in claim 1, further comprising a plurality of said plates each having a plurality of threaded anchor holes coaxially aligned with corresponding apertures and coaxial threaded bores through the plate.

7. A system aligning the surface of at least one plate being anchored to a substratum having a plurality of threaded anchor holes, the system comprising:

(a) at least one plate comprising a plurality of threaded bores coaxially aligned with corresponding threaded anchor holes, and for each threaded bore;

(b) a shim below the upper surface of the plate and comprising external threading between a shimming surface and a second surface adapted to accept rotary force for rotational movement of the shim within the threaded bore, the second surface further comprising a counterbored hole having a shoulder including a narrower passthrough aperture aligned with the threaded anchor hole;

(c) an anchor screw having a threaded body extending through the passthrough aperture for rotational mating with the threaded anchor hole for anchoring to the substratum, and having a head below the upper surface of the plate and wider than the passthrough aperture and adapted to accept rotary force for rotational movement;

(d) a means for rotating the shim within the threaded bore through the plate until the shimming side of the shim contacts the substratum and separates the plate and substratum a desired amount;

(e) a means for rotating the anchor screw within the threaded anchor hole until the anchor screw head contacts the shoulder a desired amount to pressure the anchor screw threads against the anchor hole threads to hinder further rotation of the shim within the threaded bore to simultaneously lock both the threaded shim to the substratum and the vertical adjustment of the plate; and (f) a cap including external threading between a leading surface and an outer surface adapted to accept rotary force for rotational movement, the cap further comprising a threaded eyelet aligned with the anchor screw head, and a set screw for rotational mating with the threaded eyelet and having an outer end adapted to accept rotary force and an inner end for contacting the anchor screw head.

8. A system described in claim 7:

(a) said cap having a disk shape;

(b) said means for rotating the shim within the threaded bore comprising a plurality of orifices, each sized to snugly accept insertion of a corresponding prong of an adjustment tool;

(c) said means for rotating the anchor screw within the threaded anchor hole comprising a plurality of orifices arranged as the plurality of orifices of the shim for snugly accepting the prongs of the adjustment tool; and (d) said prongs supported by a cylindrical body including indicia periodically spaced around the cylindrical circumference, indicating the amount of protrusion of the shim's shimming surface past the surface of the plate nearest to the substratum.

9. A system described in claim 8, further comprising a plurality of said plates aligned for anchoring to a substratum, each plate alignable independently of the other plates by each respective plate's shims, anchor screws, means for rotating the shim within the threaded bore through the plate and means for rotating the anchor screw within the threaded anchor hole.

* * * * *